United States Patent
Larson et al.

(10) Patent No.: US 7,804,494 B2
(45) Date of Patent: *Sep. 28, 2010

(54) POINTING DEVICE WITH INTEGRATED AUDIO INPUT AND ASSOCIATED METHODS

(75) Inventors: Jim A. Larson, Beaverton, OR (US); Ben S. Wymore, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,737

(22) Filed: Jan. 4, 2010

(65) Prior Publication Data

US 2010/0106483 A1 Apr. 29, 2010

Related U.S. Application Data

(60) Continuation of application No. 11/745,832, filed on May 8, 2007, now Pat. No. 7,656,397, which is a division of application No. 09/211,942, filed on Dec. 15, 1998, now Pat. No. 7,233,321.

(51) Int. Cl.
*G09G 5/00* (2006.01)
(52) U.S. Cl. ...................... 345/179; 345/156
(58) Field of Classification Search ............... 345/179, 345/156, 173; 434/350; 704/246; 178/18.01, 178/18.09
See application file for complete search history.

(56) References Cited

U.S. PATENT DOCUMENTS

| | | |
|---|---|---|
| 3,376,551 A | 4/1968 | Armbruster |
| 4,814,552 A | 3/1989 | Stefik et al. |
| 5,237,647 A | 8/1993 | Roberts et al. |

(Continued)

FOREIGN PATENT DOCUMENTS

EP 0622724 A2 11/1994

(Continued)

OTHER PUBLICATIONS

"U.S. Appl. No. 09/211,942, Advisory Action mailed Jan. 16, 2002", 2 pgs.

(Continued)

*Primary Examiner*—Ricardo L Osorio
(74) *Attorney, Agent, or Firm*—Schwegman, Lundberg & Woessner, P.A.

(57) ABSTRACT

A mobile personal digital assistant (PDA) allows a user to enter information using both a touch screen and voice commands with a stylus. The stylus includes a microphone positioned at one end, and a transmitter for transmitting received voice signals to either a personal computer (PC) or the PDA. In one embodiment, a wireless stylus also includes a power supply and an activation control switch. The PC is used to translate the voice signals into translated voice data which is transmitted to the PDA for storage and display. If the user and the PDA are located remotely from the receiving PC, voice signals are stored in the PDA until a later time when the PC can translate the received voice signals. Where the PDA contains a processor to translate received voice signals, the stylus transmits directly to the PDA, and the PDA translates the received voice signals.

13 Claims, 4 Drawing Sheets

U.S. PATENT DOCUMENTS

| | | | |
|---|---|---|---|
| 5,247,137 | A | 9/1993 | Epperson |
| 5,367,454 | A | 11/1994 | Kawamoto et al. |
| 5,404,442 | A | 4/1995 | Foster et al. |
| 5,420,607 | A | 5/1995 | Miller et al. |
| 5,513,309 | A | 4/1996 | Meier et al. |
| 5,526,023 | A | 6/1996 | Sugimoto et al. |
| 5,561,446 | A | 10/1996 | Montlick |
| 5,581,783 | A | 12/1996 | Ohashi |
| 5,606,594 | A | 2/1997 | Register et al. |
| 5,606,674 | A | 2/1997 | Root |
| 5,627,348 | A | 5/1997 | Berkson et al. |
| 5,635,682 | A | 6/1997 | Cherdak et al. |
| 5,721,852 | A | 2/1998 | Porter |
| 5,724,410 | A | 3/1998 | Parvulescu et al. |
| 5,769,643 | A | 6/1998 | Stevens, III |
| 5,778,404 | A | 7/1998 | Capps et al. |
| 5,818,425 | A | 10/1998 | Want et al. |
| 5,825,921 | A | 10/1998 | Dulong |
| 5,850,058 | A | 12/1998 | Tano et al. |
| 5,867,821 | A | 2/1999 | Ballantyne et al. |
| 5,894,595 | A | 4/1999 | Foladare et al. |
| 5,914,708 | A | 6/1999 | LaGrange et al. |
| 5,917,493 | A | 6/1999 | Tan et al. |
| 5,978,452 | A | 11/1999 | Cho |
| 5,983,073 | A | 11/1999 | Ditzik |
| 6,003,774 | A | 12/1999 | Bard et al. |
| 6,061,052 | A | 5/2000 | Raviv et al. |
| 6,111,565 | A | 8/2000 | Chery et al. |
| 6,112,174 | A | 8/2000 | Wakisaka et al. |
| 6,118,437 | A | 9/2000 | Fleck et al. |
| 6,195,446 | B1 | 2/2001 | Skoog |
| 6,218,964 | B1 | 4/2001 | Ellis |
| 6,238,217 | B1 | 5/2001 | Mirando et al. |
| 6,243,071 | B1 | 6/2001 | Shwarts et al. |
| 6,243,092 | B1 | 6/2001 | Okita et al. |
| 6,246,895 | B1 | 6/2001 | Plewes |
| 6,262,684 | B1 | 7/2001 | Stewart et al. |
| 6,289,464 | B1 | 9/2001 | Wecker et al. |
| 6,295,372 | B1 | 9/2001 | Hawkins et al. |
| 6,297,830 | B1 | 10/2001 | Hoddie et al. |
| 6,337,914 | B1 | 1/2002 | Phillipps |
| 6,362,440 | B1 | 3/2002 | Karidis et al. |
| 6,396,481 | B1 | 5/2002 | Challa et al. |
| 6,429,846 | B2 | 8/2002 | Rosenberg et al. |
| 6,621,697 | B2 | 9/2003 | O'Hara et al. |
| 6,633,282 | B1 | 10/2003 | Monroe |
| 7,233,321 | B1 | 6/2007 | Larson et al. |
| 2004/0046744 | A1 | 3/2004 | Rafii et al. |
| 2004/0143689 | A1 | 7/2004 | Leavitt |
| 2008/0170049 | A1 | 7/2008 | Larson et al. |

FOREIGN PATENT DOCUMENTS

| | | |
|---|---|---|
| JP | 404113449 | 4/1992 |
| JP | 06-131108 | 5/1994 |
| JP | 410093671 | 10/1998 |

OTHER PUBLICATIONS

"U.S. Appl. No. 09/211,942, Advisory Action mailed Feb. 13, 2003", 2 pgs.

"U.S. Appl. No. 09/211,942, Amendment Under 37 C.F.R. filed Mar. 7, 2002", 3 pgs.

"U.S. Appl. No. 09/211,942, Final Office Action mailed Feb. 9, 2004", 11 pgs.

"U.S. Appl. No. 09/211,942, Final Office Action mailed Mar. 3, 2006", 7 pgs.

"U.S. Appl. No. 09/211,942, Final Office Action mailed Jul. 27, 2001", 7 pgs.

"U.S. Appl. No. 09/211,942, Final Office Action mailed Nov. 6, 2002", 9 pgs.

"U.S. Appl. No. 09/211,942, Non Final Office Action mailed Mar. 24, 2005", 8 pgs.

"U.S. Appl. No. 09/211,942, Non Final Office Action mailed Apr. 10, 2001", 7 pgs.

"U.S. Appl. No. 09/211,942, Non Final Office Action mailed May 29, 2003", 11 pgs.

"U.S. Appl. No. 09/211,942 Non Final Office Action mailed Jul. 5, 2006", 8 pgs.

"U.S. Appl. No. 09/211,942, Non Final Office Action mailed Jul. 12, 2004", 11 pgs.

"U.S. Appl. No. 09/211,942, Non Final Office Action mailed Aug. 23, 2000", 5 pgs.

"U.S. Appl. No. 09/211,942, Notice of Allowance mailed Feb. 8, 2007", 3 pgs.

"U.S. Appl. No. 09/211,942, Response filed Jan. 29, 2003 to Final Office Action mailed Nov. 6, 2002", 11 pgs.

"U.S. Appl. No. 09/211,942, Response filed Feb. 23, 2001 to Non Final Office Action mailed Aug. 23, 2000", 3 pgs.

"U.S. Appl. No. 09/211,942, Response filed Jul. 10, 2001 to Non Final Office Action mailed Apr. 10, 2001", 6 pgs.

"U.S. Appl. No. 09/211,942, Response filed Aug. 14, 2002 to Non Final Office Action mailed May 14, 2002", 20 pgs.

"U.S. Appl. No. 09/211,942, Response filed Aug. 29, 2003 to Non Final Office Action mailed May 29, 2003", 29 pgs.

"U.S. Appl. No. 09/211,942, Response filed Sep. 26, 2005 to Non Final Office Action mailed Mar. 24, 2005", 14 pgs.

"U.S. Appl. No. 09/211,942, Response filed Oct. 12, 2004 to Non Final Office Action mailed Jul. 12, 2004", 12 pgs.

"U.S. Appl. No. 09/211,942, Response filed Oct. 29, 2001 to Final Office Action mailed Jul. 27, 2001", 4 pgs.

"U.S. Appl. No. 09/211,942, Response filed Dec. 5, 2006 to Non Final Office Action mailed Jul. 5, 2006", 9 pgs.

"U.S. Appl. No. 09/211,942, Response filed Apr. 8, 2004 to Final Office Action mailed Feb. 9, 2004", 27 pgs.

"U.S. Appl. No. 09/528,399, Final Office Action mailed Jan. 2, 2003", 10 pgs.

"U.S. Appl. No. 09/528,399, Final Office Action mailed Oct. 23, 2006", 11 pgs.

"U.S. Appl. No. 09/528,399, Final Office Action mailed Oct. 4, 2005", 12 pgs.

"U.S. Appl. No. 09/528,399, Final Office Action mailed Dec. 8, 2003", 14 pgs.

"U.S. Appl. No. 09/528,399, Non-Final Office Action mailed Apr. 6, 2005", 11 pgs.

"U.S. Appl. No. 09/528,399, Non-Final Office Action mailed May 28, 2003", 12 pgs.

"U.S. Appl. No. 09/528,399, Non-Final Office Action mailed Jun. 6, 2006", 10 pgs.

"U.S. Appl. No. 09/528,399, Non-Final Office Action mailed Jun. 7, 2004", 9 pgs.

"U.S. Appl. No. 09/528,399, Non-Final Office Action mailed Sep. 10, 2002", 10 pgs.

"U.S. Appl. No. 09/528,399, Response filed Jan. 23, 2007 Final Office Action mailed Oct. 23, 2007", 17 pgs.

"U.S. Appl. No. 09/528,399, Response filed Jan. 4, 2006 Final Office Action mailed Oct. 4, 2005", 16 pgs.

"U.S. Appl. No. 09/528,399, Response filed Oct. 28, 2004 Non-Final Office Action mailed Jun. 7, 2004", 13 pgs.

"U.S. Appl. No. 09/528,399, Response filed Nov. 12, 2002 Non-Final Office Action mailed Sep. 10, 2002", 13 pgs.

"U.S. Appl. No. 09/528,399, Response filed Feb. 9, 2004 Final Office Action mailed Dec. 8, 2003", 19 pgs.

"U.S. Appl. No. 09/528,399, Response filed Mar. 3, 2003 Final Office Action mailed Jan. 2, 2003", 18 pgs.

"U.S. Appl. No. 09/528,399, Response filed Jun. 7, 2005 Non-Final Office Action mailed Apr. 6, 2005", 15 pgs.

"U.S. Appl. No. 09/528,399, Response filed Aug. 2, 2006 Non-Final Office Action mailed Jun. 6, 2006", 17 pgs.

"U.S. Appl. No. 09/528,399, Response filed Aug. 28, 2003 Non-Final Office Action mailed May 28, 2003", 18 pgs.

"U.S. Appl. No. 11/745,832, Non Final Office Action mailed Apr. 2, 2009", 11 pgs.

"U.S. Appl. No. 11/745,832, Response filed Jul. 1, 2009 to Non Final Office Action mailed Apr. 2, 2009", 12 pgs.

"U.S. Appl. No. 09/211,942, Non Final Office Action mailed May 14, 2002", 7 pgs.

"U.S. Appl. No. 11/745,832, Notice of Allowance mailed Sep. 24, 2009", 9 pgs.

ized, specific embodiments of the invention is defined only by the appended claims.

POINTING DEVICE WITH INTEGRATED AUDIO INPUT AND ASSOCIATED METHODS

CONTINUATION APPLICATION

The present application is a continuation of U.S. patent application Ser. No. 11/745,832, filed on May 8, 2007, now issued as U.S. Pat. No. 7,656,397, which is a divisional of U.S. patent application Ser. No. 09/211,942, filed on Dec. 15, 1998, now issued as U.S. Pat. No. 7,233,321, both of which applications are incorporated herein by reference in their entireties.

TECHNICAL FIELD

Embodiments of the inventive subject matter relate generally to input devices and, in particular, to pointer-type input devices used with touch-sensitive processing devices.

BACKGROUND INFORMATION

Advancements in processing power have enabled the design and manufacture of processing devices which deviate from a traditional input device such as a keyboard. For example, hardware and software have been developed which allow a user to control a computer using normal speech. The user is also capable of dictating information to be stored in memory provided with the computer. Presently, however, accurate speech input must be provided to allow the processor to accurately translate the speech into computer readable data. As such, it is desired to locate a microphone close to the user such that background noise is minimized. Present systems, therefore, require that the user wear a headset to position the microphone close to the user's mouth. The processing power required to perform speech recognition, combined with the requirement for high-quality speech input, dictates that a user operate a traditional stationary personal computer.

Mobile personal computing devices, such as lap-top computers and personal digital assistant (PDA) devices, are available with touch screens as input devices. These touch screens allow a user to touch locations on the display screen to indicate desired input. This type of input allows manufacturers to simplify the interface between the user and the processor, while still providing flexibility to adapt to changes in software executed by the processor.

For the reasons stated above, and for other reasons stated below which will become apparent to those skilled in the art upon reading and understanding the present specification, there is a need in the art for a mobile personal computing device which allows a user to enter information using both a touch screen and voice commands.

DETAILED DESCRIPTION

In the following detailed description of embodiments of the invention, reference is made to the accompanying drawings which form a part hereof, and in which is shown by way of illustration, but not of limitation, specific embodiments of the invention. These embodiments are described in sufficient detail to enable those skilled in the art to practice them, and it is to be understood that other embodiments may be utilized and that logical, mechanical and electrical changes may be made without departing from the spirit and scope of the present disclosure. The following detailed description is, therefore, not to be taken in a limiting sense, and the scope of embodiments of the present invention is defined only by the appended claims.

Figure 1:
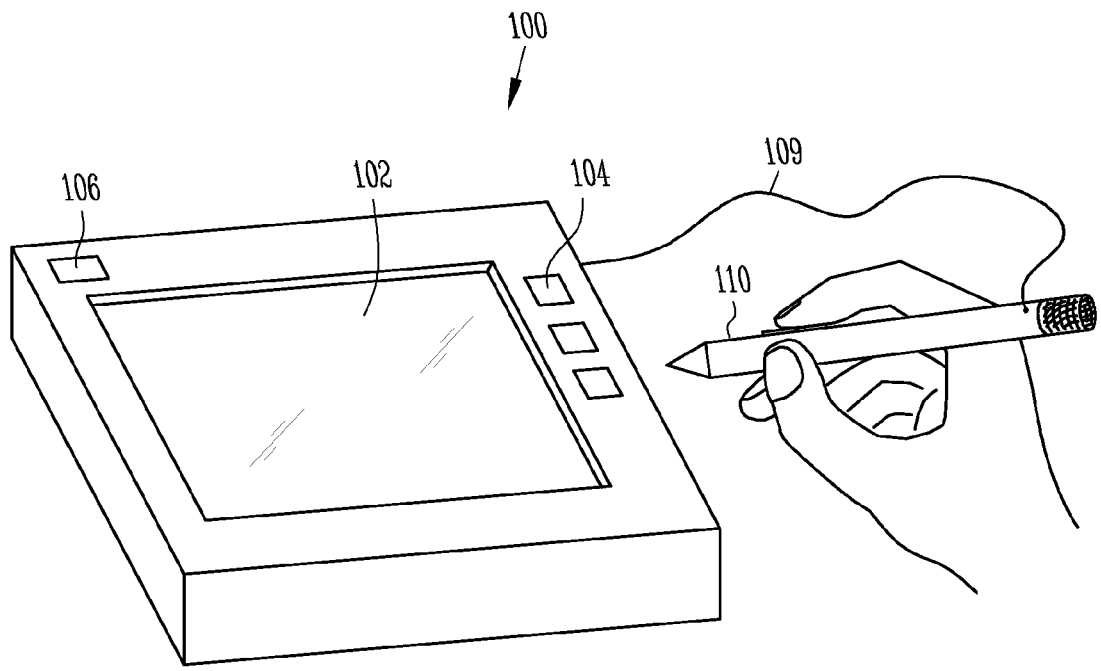
FIG. 1 is illustrates a personal computing device having a touch screen, in accordance with an embodiment of the inventive subject matter.

Referring to FIG. 1, a personal digital assistant (PDA) having a touch screen is described. The PDA 100 is designed to be portable and allow a user to store and recall information. The computing device or PDA 100 includes a touch screen 102, keypad inputs 104, and optional microphone 106. The touch screen 102 can be controlled using a pointing device, or stylus 110. In one embodiment, the stylus 110 includes a microphone 120 receiving acoustical voice commands which are used to input data and/or control the PDA 100. It will be appreciated that the PDA 100 is typically used in a manner which positions the PDA 100 approximately 12 to 18 inches away from a user's mouth. As such, optional microphone 106 is susceptible to background noise. To reduce the effects of background noise, a microphone is provided in the stylus 110 as described in greater detail below. As illustrated in FIG. 1, the stylus 110 can be tethered to the PDA 100 via a wire 109 such that the wire 109 is used for wired communication between the stylus 110 and the PDA 100. This wire is optional, such that in another embodiment the stylus communicates via wireless transmissions. In any event, the stylus is in the immediate vicinity of the PDA. The acoustical voice signals (i.e. speech) received by the stylus 110 are typically translated and displayed on the touch screen 102. The translated data is stored in the PDA 100 such that the user can retrieve the information and view the stored data. The term "personal digital assistant" (PDA) is used herein to define any mobile computing device intended to store and communicate information for use by a user. This information is typically personal in nature, such as addresses, notes, schedules and the like. The PDA 100 can include lap top computers with a touch screen. The PDA 100 can also include communication circuitry for bi-directional communication with external devices, such as fax machines and networked computers. Thus, PDA's are not limited to data storage and display devices.

Figure 2:
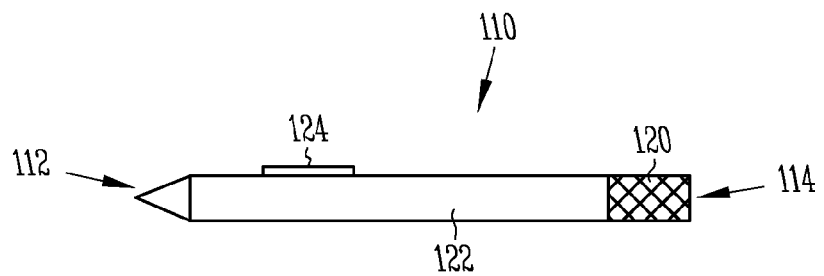
FIG. 2 illustrates a pointing device for use with the personal computing device of FIG. 1.

One embodiment of a pointing stylus is illustrated in FIG. 2. Stylus 110 includes a first end 112 having a point, and an opposite, second end 114 which includes a microphone 120. The stylus 110 is not limited to having a pointed end, and the end can be, but is not limited to, round, flat or bulbous. The stylus 110 includes a housing 122 which houses an electronic transmitter circuit. An activation switch 124 is provided to allow a user to selectively activate the microphone and transmitter circuits. The stylus 110 is intended to be hand-held and used in a manner similar to a pen. The stylus 110, however, is used to selectively contact touch screen 102 of the PDA to provide input. It will be appreciated that the stylus 110 allows a user to position the microphone 120 close to his or her mouth to increase the quality of voice signals, while reducing the effect of background noise.

Figure 3:
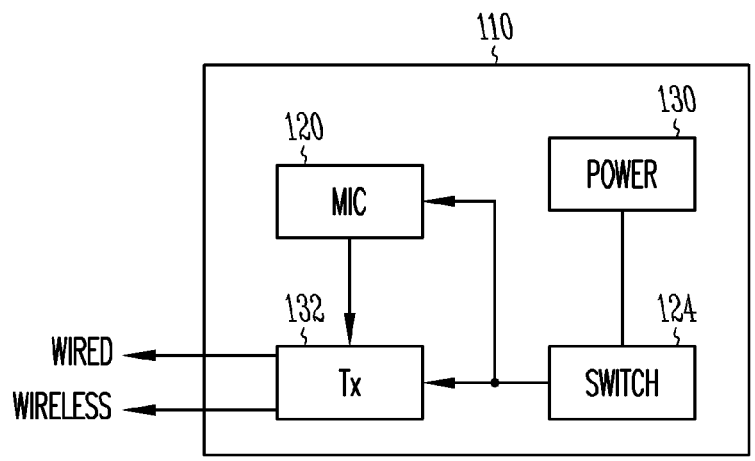
FIG. 3 is a block diagram of circuitry of the pointing device of FIG. 2.

One embodiment of circuitry provided in stylus 110 is illustrated in the block diagram of FIG. 3. The circuitry includes microphone 120, a power source 130, switch 124, and a transmitter circuit 132. The transmitter circuit 132 can be configured to either transmit information to the PDA through a wire, or to transmit voice data via a wireless communications signal. If a wired embodiment is desired, power source 130 can be located in the PDA to reduce circuitry located in the stylus 110. In a wireless embodiment, however, the power source 130 is preferably a battery stored within the housing of the stylus 110. Switch 124 is used to activate the microphone and transmitter circuits 120 and 132, respectively, to allow voice signals to be transmitted to a receiving personal computer (Refer to FIGS. 4 and 5). As such, the switch 124 is typically located along the housing of the stylus 110 such that it is easily activated by a finger of the user. The stylus 110 can be configured to transmit electronic voice signals only while the switch 124 is activated. Alternatively, the stylus 110 can transmit voice signals in response to a single activation of the switch 124. In this embodiment, the transmitter 132 of the stylus 110 ends the transmission when input voice signals are not detected for a predefined time period. In yet another embodiment, the switch 124 is used to both activate the transmitter 132 to start voice signal transmissions, and to deactivate the transmitter 132 to end transmissions of voice signals.

Figure 4:
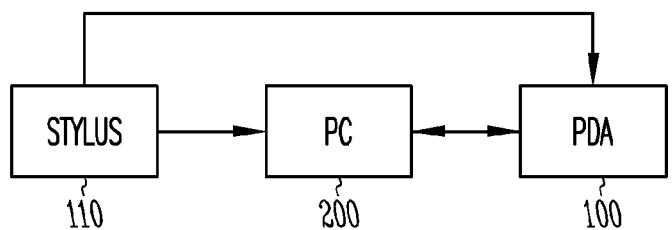
FIG. 4 illustrates one embodiment of a voice processing system, in accordance with the inventive subject matter.
Figure 5:
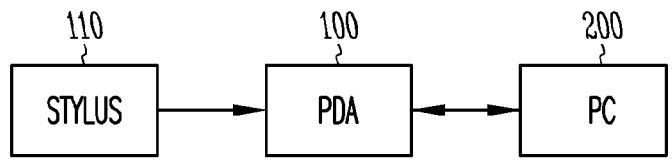
FIG. 5 illustrates another embodiment of a voice processing system, in accordance with the inventive subject matter.
Figure 6:
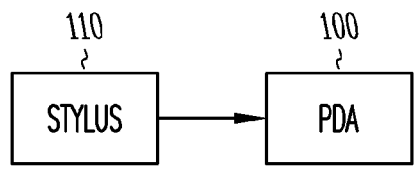
FIG. 6 illustrates another embodiment of a voice processing system, in accordance with the inventive subject matter.

Referring to FIGS. 4-6, different operational embodiments are described of a voice processing system using the above described stylus 110. In a first embodiment, shown in FIG. 4, the stylus 110 communicates electronic voice signals with a PC 200 and directly with PDA 100 via a touch screen. The PC 200 is a home or a business computer intended for stationary use. The PC 200 includes a wireless receiver for receiving wireless transmissions from the stylus 110. Voice signals received by the PC 200 are translated into computer recognizable or readable data. While the voice signals received by the PC 200 can be used by the PC 200 to perform more processing or other operations, it is intended, in an embodiment of the present system, that the PC 200 transmits translated voice information to the PDA 100 via wireless communication. As such, a user operating the PDA 100 activates touch screen 102 using stylus 110 and speaks into the microphone 120. The voice signals are transmitted from the stylus 110 to PC 200 where the voice signals are translated into data. The data is then transmitted from the PC 200 to the PDA 100. It will be appreciated that the physical distance between the user and the PC 200 is limited by the transmission power of the stylus transmitter 132, the PDA 100 and the PC 200. This embodiment allows mobility of the user while maintaining the processing power of the PC 200 for voice recognition.

In another embodiment shown in FIG. 5, stylus 110 transmits voice data to PDA 100. The PDA transmits the received voice data to PC 200. The PC 200 then translates the received voice signals into data, and it transmits the translated data back to the PDA 100. This embodiment allows for a more powerful transmitter to be used between the PC 200 and the PDA 100, than may be available with transmitter 132 (Refer to FIG. 3). In either of the first two embodiments, when the PDA 100 is located geographically away from the PC 200 such that communication between them is not possible, the PDA 100 receives voice data from the stylus 110 and records the voice data for future translation. When the PDA 100 returns to a location where communication with the PC 200 is possible, the recorded voice data is transmitted to the PC 200 for translation, and the translated data is transmitted back to the PDA 100. This option allows a user to use voice commands regardless of location relative to the PC 200. If the user retrieves the voice signals prior to translation, the PDA 100 will play the stored signals instead of displaying translated data on the screen.

FIG. 6 illustrates an embodiment where the stylus 110 communicates with the PDA 100, and the PDA 100 performs the speech recognition operations. This embodiment allows the stylus 110 to communicate, in either a wireless or wired manner, with the PDA 100.

A mobile PDA has been described which allows a user to enter information using both a touch screen and voice commands. A stylus has been described which includes a microphone positioned at one end, and a transmitter for transmitting received voice signals to either a PC or the PDA. The wireless stylus also includes a power supply and an activation control switch. The PC can be used to translate the voice signals into computer recognizable data which is transmitted to the PDA for storage and display. If the user and the PDA are located remotely from the receiving PC, voice signals are stored in the PDA until a later time when the PC can translate the received voice signals. This application is intended to cover any adaptations or variations of embodiments of the present invention. For example, the PDA may contain a processor and software sufficient to translate received voice signals such that the PC 200 is not necessary. As such, the stylus transmits directly to the PDA, and the PDA translates received voice signals.

Figure 7:
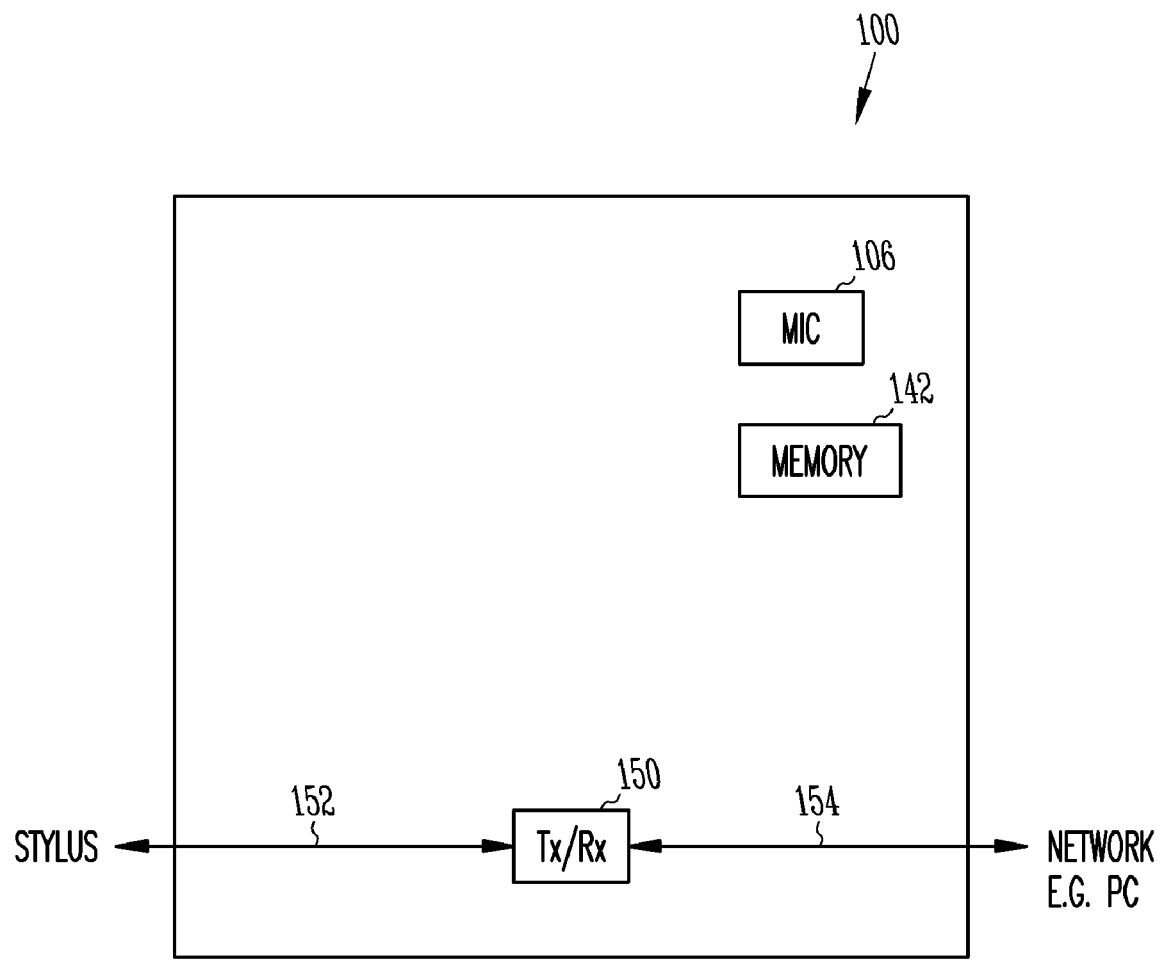
FIG. 7 illustrates a block diagram of an embodiment of a mobile computing device, in accordance with the inventive subject matter.

FIG. 7 illustrates a block diagram of an embodiment of a mobile computing device such as a PDA 100. The PDA 100 in this example may comprise a microphone 106, a memory 142, and a transmitter/receiver element (hereinafter "transceiver") 150. Transceiver 150 may be coupled to a stylus via a link 152, which may be either a wired or wireless link. Transceiver 150 may also be coupled via link 154 to a network that may include a FAX machine or PC (such as PC 200, FIGS. 4, 5, and 8).

Figure 8:
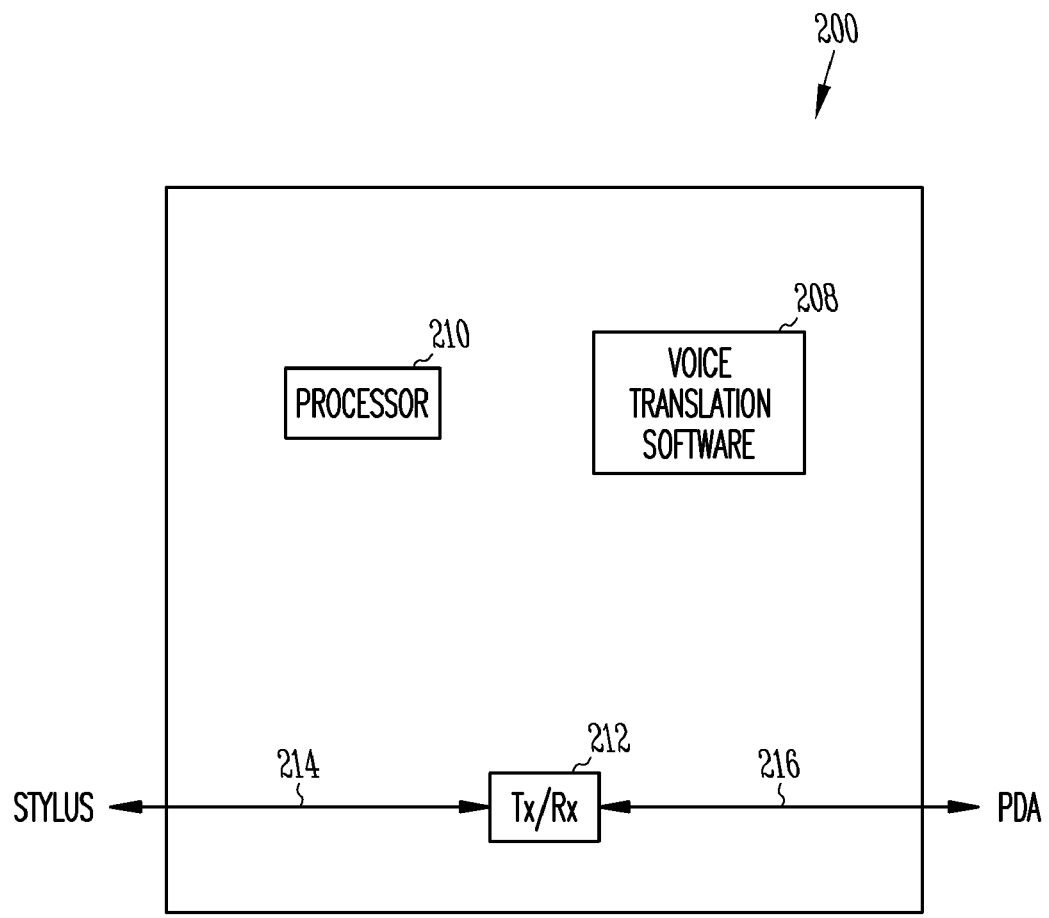
FIG. 8 illustrates a block diagram of an embodiment of a personal computer, in accordance with the inventive subject matter.

FIG. 8 illustrates a block diagram of an embodiment of a PC 200. PC 200 in this example may comprise a processor 210 and voice translation (alternatively referred to herein as speech recognition) software 208. PC 200 may also comprise a transceiver 212. Transceiver 212 may be coupled to a stylus via link 214, which may be a wireless link. Transceiver 212 may also be coupled via link 216 to a mobile computing device (such as PDA 100, FIGS. 1 and 4-7).

Although specific embodiments have been illustrated and described herein, it will be appreciated by those of ordinary skill in the art that any arrangement which is calculated to achieve the same purpose may be substituted for the specific embodiment shown. Therefore, it is manifestly intended that embodiments of this invention be limited only by the claims and the equivalents thereof.

What is claimed is:

1. A method comprising:
   a microphone located on a pointing device, in the vicinity of a personal digital assistant (PDA), outputting electronic voice signals from speech that has been input into the microphone;
   the PDA wirelessly transmitting the electronic voice signals to a personal computer (PC);
   the PC wirelessly receiving the electronic voice signals;
   the PC performing voice recognition processing on the electronic voice signals to produce translated data;

the PC wirelessly transmitting the translated data to the PDA;

the PDA wirelessly receiving the translated data; and the PDA visually displaying the translated data.

2. The method of claim 1 wherein the electronic voice signals output by the microphone are wirelessly transmitted to the PDA.

3. The method of claim 1 wherein the electronic voice signals output by the microphone are transmitted by at least one wire to the PDA.

4. A method comprising:

a microphone located on a pointing device, in the vicinity of a personal digital assistant (PDA) outputting electronic voice signals from speech that has been input into the microphone;

the PDA wirelessly receiving the electronic voice signals;

the PDA wirelessly transmitting the electronic voice signals to a personal computer (PC) when the PDA is located geographically such that communication between the PDA and PC is possible, and otherwise the PDA storing the electronic voice signals;

the PC wirelessly receiving the electronic voice signals;

the PC performing voice recognition processing on the electronic voice signals to produce translated data;

the PC wirelessly transmitting the translated data to the PDA;

the PDA wirelessly receiving the translated data; and the PDA visually displaying the translated data.

5. The method of claim 4 wherein the microphone is on the PDA.

6. The method of claim 4 wherein the microphone is located within a stylus in the vicinity of the PDA.

7. The method of claim 6 wherein the electronic voice signals output by the microphone are wirelessly transmitted from the stylus to the PDA.

8. The method of claim 6 wherein the electronic voice signals output by the microphone are transmitted by at least one wire from the stylus to the PDA.

9. A method comprising:

a microphone located on a pointing device, in the vicinity of a personal digital assistant (PDA), outputting electronic voice signals from speech that has been input into the microphone;

the PDA wirelessly transmitting the electronic voice signals to a personal computer (PC);

the PC wirelessly receiving the electronic voice signals;

the PC performing voice recognition processing on the electronic voice signals to produce translated data;

the PC wirelessly transmitting the translated data to the PDA;

the PDA wirelessly receiving the translated data; and the PDA visually displaying the translated data.

10. The method of claim 9 wherein the electronic voice signals output by the microphone are wirelessly transmitted to the PDA.

11. The method of claim 9 wherein the electronic voice signals output by the microphone are transmitted by at least one wire from the microphone to the PDA.

12. The method of claim 4, further comprising:

the PDA playing the stored electronic voice signals.

13. The method of claim 4, further comprising:

the PDA playing the stored electronic voice signals instead of visually displaying translated data, if the PDA is located geographically such that communication between the PDA and PC is not possible.

* * * * *